(12) United States Patent  (10) Patent No.: US 8,803,028 B1
Daily  (45) Date of Patent: Aug. 12, 2014

(54) APPARATUS FOR ETCHING MULTIPLE SURFACES OF LUMINAIRE REFLECTOR

(75) Inventor: Thomas V. Daily, Brookline, MA (US)

(73) Assignee: Genlyte Thomas Group, LLC, Eindhoven (NL)

( * ) Notice: Subject to any disclaimer, the term of this patent is extended or adjusted under 35 U.S.C. 154(b) by 2389 days.

(21) Appl. No.: 11/250,092

(22) Filed: Oct. 13, 2005

Related U.S. Application Data

(60) Provisional application No. 60/670,815, filed on Apr. 13, 2005.

(51) Int. Cl.
*B23K 26/40* (2014.01)

(52) U.S. Cl.
USPC ................... 219/121.68; 219/121.69

(58) Field of Classification Search
USPC ............... 219/121.11, 121.6, 121.68, 121.69, 219/121.73, 121.8, 121.82, 121.86; 438/662
See application file for complete search history.

(56) References Cited

U.S. PATENT DOCUMENTS

| | | | |
|---|---|---|---|
| 3,663,793 A | 5/1972 | Petro et al. |
| 3,770,936 A | 11/1973 | Rively et al. |
| 3,832,948 A | 9/1974 | Barker |
| 4,480,169 A | 10/1984 | Macken |
| 4,500,771 A | 2/1985 | Miller |
| 4,535,218 A | 8/1985 | Krause et al. |
| 4,822,987 A | 4/1989 | Goldenfield et al. |
| 4,937,425 A | 6/1990 | Chang et al. |
| 4,947,022 A | 8/1990 | Ostroff et al. |
| 4,960,984 A | 10/1990 | Goldenfield et al. |
| 4,990,792 A | 2/1991 | Frei |
| 5,206,496 A | 4/1993 | Clement et al. |
| 5,246,530 A | 9/1993 | Bugle et al. |
| 5,269,882 A | 12/1993 | Jacobsen |
| 5,292,625 A | 3/1994 | McFadden et al. |
| 5,298,717 A | 3/1994 | DeRossett, Jr. |
| 5,338,645 A | 8/1994 | Henderson et al. |
| 5,633,105 A | 5/1997 | Jensen et al. |
| 5,637,244 A | 6/1997 | Erokhin |
| 5,761,995 A | 6/1998 | Laiserin et al. |
| 5,798,202 A | 8/1998 | Cushner et al. |
| 5,817,243 A | 10/1998 | Shaffer |
| 5,886,317 A | 3/1999 | Hinrichs et al. |
| 6,159,388 A | 12/2000 | Yanagisawa et al. |
| 6,262,388 B1 | 7/2001 | Canella et al. |
| 6,299,707 B1 | 10/2001 | McCay et al. |
| 6,337,465 B1 | 1/2002 | Masters et al. |
| 6,362,451 B1 | 3/2002 | Karni et al. |
| 6,417,484 B1 | 7/2002 | Canella et al. |
| 6,653,592 B2 | 11/2003 | Andersen |
| 6,678,094 B2 | 1/2004 | Sator et al. |
| 6,762,787 B2 | 7/2004 | Beier |
| 6,779,716 B1 | 8/2004 | Grow |
| 6,788,714 B2 | 9/2004 | Benderly |
| 6,861,364 B1 | 3/2005 | Koide |
| 2001/0039912 A1 | 11/2001 | Sutton |
| 2003/0155328 A1 | 8/2003 | Huth et al. |
| 2004/0004770 A1 | 1/2004 | Ebina et al. |
| 2004/0148775 A1 | 8/2004 | Kobayakawa |
| 2005/0045586 A1 | 3/2005 | Ellin et al. |

*Primary Examiner* — Brian Jennison

(57) ABSTRACT

An apparatus for etching multiple surfaces of a hydroformed powder coated luminaire reflector is described. The system includes a laser, one or more high speed scan heads, a laser marking station and a conveyance device. The system positions a reflector into optical alignment with the scan heads to allow permanent etching of the surface thereof.

18 Claims, 10 Drawing Sheets

US 8,803,028 B1

APPARATUS FOR ETCHING MULTIPLE SURFACES OF LUMINAIRE REFLECTOR

CROSS-REFERENCE TO RELATED APPLICATIONS

This application claims benefit under 35 USC 119(e) of U.S. Patent Application No. 60/670,815, filed Apr. 13, 2005, the disclosure of which is herein incorporated by reference.

BACKGROUND OF THE INVENTION

The present invention relates in general to laser technology for etching of surfaces on a luminaire reflector and more particularly, to an apparatus and method for ablating a surface on a powder coated luminaire reflector with a laser.

Luminaires must be appropriately marked with requisite indicia as set forth in Underwriters Laboratory requirements, particularly in UL 1598 Standard, Second Edition, Section 20. Per the UL requirements, the luminaire must be legibly marked with various information such as is set forth in Section 20.1.1. Historically, luminaire manufacturers have met this requirement by placing a sticker on the interior surface of a luminaire such that when the luminaire is relamped, all of the requisite marking information is legible.

However, problems arise when applying the adhesive backed label or sticker to the interior surface of the luminaire. The interior reflector of a luminaire is made to be as reflective as possible per the requirements of the luminaire specifications. The luminaire typically is designed such that the reflector has necessary reflective characteristics to provide adequate dispersion of light. By placing the sticker with the requisite UL material on the interior reflective surface of the luminaire reflector, the reflective characteristics of the luminaire are negatively modified.

Additional problems arise when applying an adhesive backed sticker to the luminaire reflector. This includes applying the sticker to a curved surface since recessed luminaires typically are frusto-conical in design and curve from the exit aperture upward towards the lamp socket, or along at least a portion thereof. The sticker that is applied must conform to this curved surface. Since the sticker itself is flat and planer, application of the sticker to the curved surface of the interior reflector of the luminaire causes air bubble entrapment within the sticker gathering along the shorter edge, and proper placement is difficult during the manufacturing process.

A further issue is the material on which the sticker is placed. Typical reflectors for recessed luminares are made from hydroformed aluminum or other metal which are then powder coated to provide the smooth white glossy finish which is standard for the reflector in the luminaire industry. This powder coated finish provides an ideal smooth and reflective surface for the luminaire reflector.

Thus, it is desirable to provide a marking method and apparatus for a surface of the luminaire reflector to be marked permanently so as to meet the requirements of UL while also minimum changing the reflective characteristics of the reflector housed within the luminaire.

SUMMARY OF THE INVENTION

The present invention is therefore directed towards an apparatus and a method for application of legible marking indicia on a surface of a powder coated luminaire reflector, or any other type of luminaire reflector, to ensure the legibility of the indicia placed thereon after long term continued use.

A further object of the present invention is to provide a method and an apparatus for laser marking of a surface of a luminaire reflector utilizing a laser etching station when a luminaire reflector is positioned for adequate etching by laser ablation.

An additional object of the present invention is to provide a method and an apparatus for laser ablation of an interior and an exterior surface of a powder coated luminaire reflector which is fully automated and which properly positions the luminaire reflector into optical alignment with the laser lens system in order to adequately and permanently etch a surface of the luminaire reflector with the requisite indicia material.

One other object of the present invention is to provide a laser etching system which is operatively interfaced with a conveyance and material handling system for a luminaire reflector which passes the luminaire reflector into a laser etching station for temporary positioning and, while in such temporary position, applies a high energy etching laser to a surface of the luminaire in order to properly mark the luminaire with requisite indicia.

An even further object of the present invention is to provide an automated material handling system for laser etching of a powder coated reflector utilized in a luminaire wherein the reflector is conveyed automatically into a laser etching station, maintained in optical alignment with a laser scanning head, etched on a first and/or a second surface of the luminaire reflector in order to permanently mark the luminaire reflector with legible indicia, and continued handling of the luminaire reflector out of the laser etching station.

An additional object of the present invention is to provide for a process of laser etching of a powder coated luminaire reflector wherein the luminaire reflector is oriented in a marking position on a conveyor system. The luminaire reflector is then conveyed into a laser etching station and positioned in the laser etching station into a marking position such that it is in optical alignment with a laser scanning head. Once in such position, the luminaire reflector is ablated with a laser on one or multiple surfaces while a vacuum is maintained within a laser etching station in order to remove particulate materials ablated therefrom. Finally, the luminaire reflector is passed out of said laser etching station onto a material handling system.

An additional object of the present invention is to provide a method for etching the interior curved surface of a powder coated luminaire reflector wherein the reflector is conveyed into a laser etching station through an infeed conveyor and a first door is closed on either side of the etching station. The luminaire reflector is then positioned in optical alignment with a laser scanning head. After proper positioning, the luminaire reflector is etched on an interior curved surface of the reflector with a laser emanating from a laser generator through the laser scanning head. A second door on the laser etching station is then opened allowing the luminaire to be conveyed from the etching station onto an outfeed conveyor.

Finally, a further exemplary object of the present invention, as all objects of the invention stated herein are exemplary, is for a laser etching station for marking a curved surface of a powder coated luminaire reflector which includes a conveyor extending through a laser etching station, a laser which is optically connected to a first scan head, the first scan head positioned adjacent an aperture in the laser etching station. The scan head directs a laser beam into the laser etching station. A first side door and a second side door are actuatable on the laser etching station in order to open and close allowing the powder coated luminaire reflector to enter and exit from the station. The powder coated luminaire reflector is then positioned in optical alignment or path of a laser within the laser etching station wherein the focal point of the laser beam emitted by the first scan head of the laser is optimized along a curved plane of an interior surface of the powder coated reflector.

These and other objects of the present invention are provided for by the apparatus and method of etching on multiple surfaces of the luminaire reflector described herein. These objects of the invention however are exemplary only and are provided herein for summary purposes only as the spirit of the invention may only be properly interpreted after incorporating the full scope of the teachings hereof including the claims, specification and drawings set forth herein.

BRIEF DESCRIPTION OF THE DRAWINGS

The present invention will be more apparent from the following description of the exemplary embodiment thereof with reference to the accompanying drawings, wherein.

DESCRIPTION OF THE PREFERRED EMBODIMENTS

Figure 1:
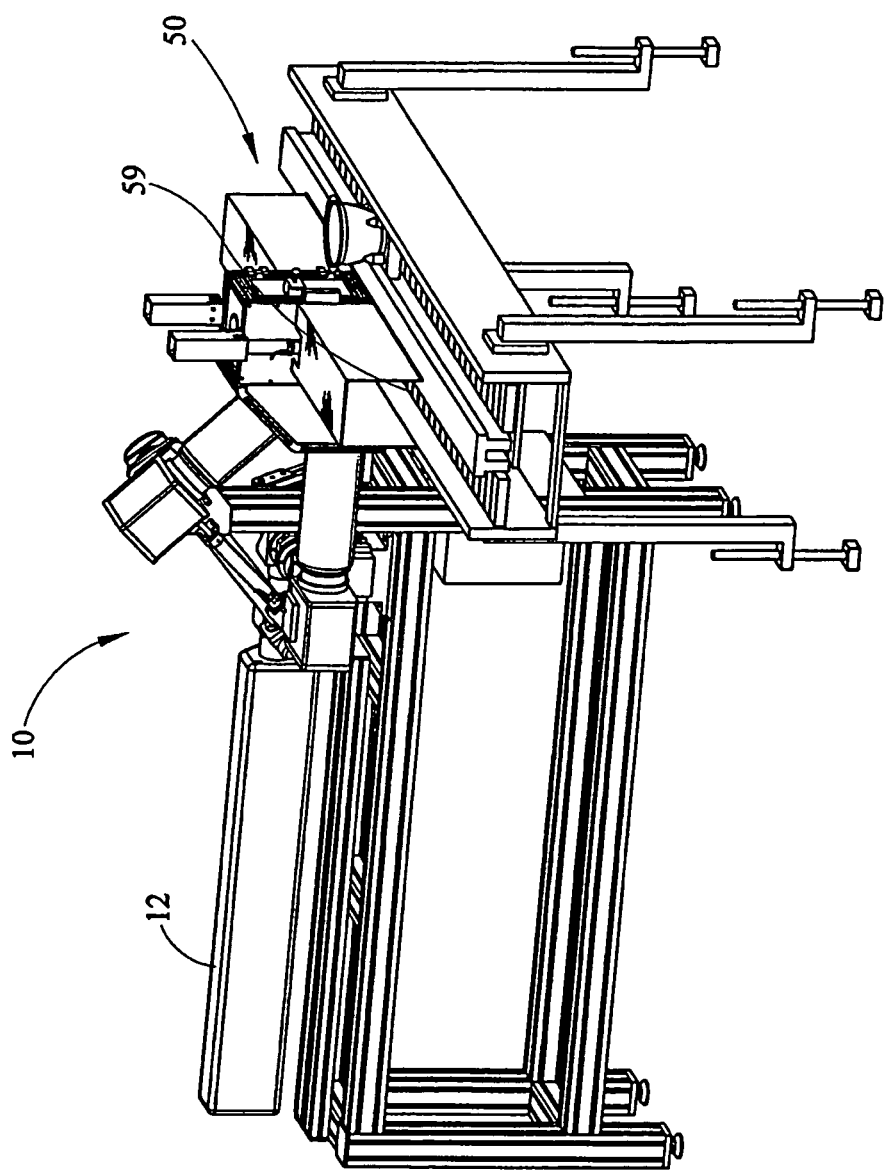
FIG. 1 is a perspective view of the laser marking apparatus of the present invention.
Figure 2:
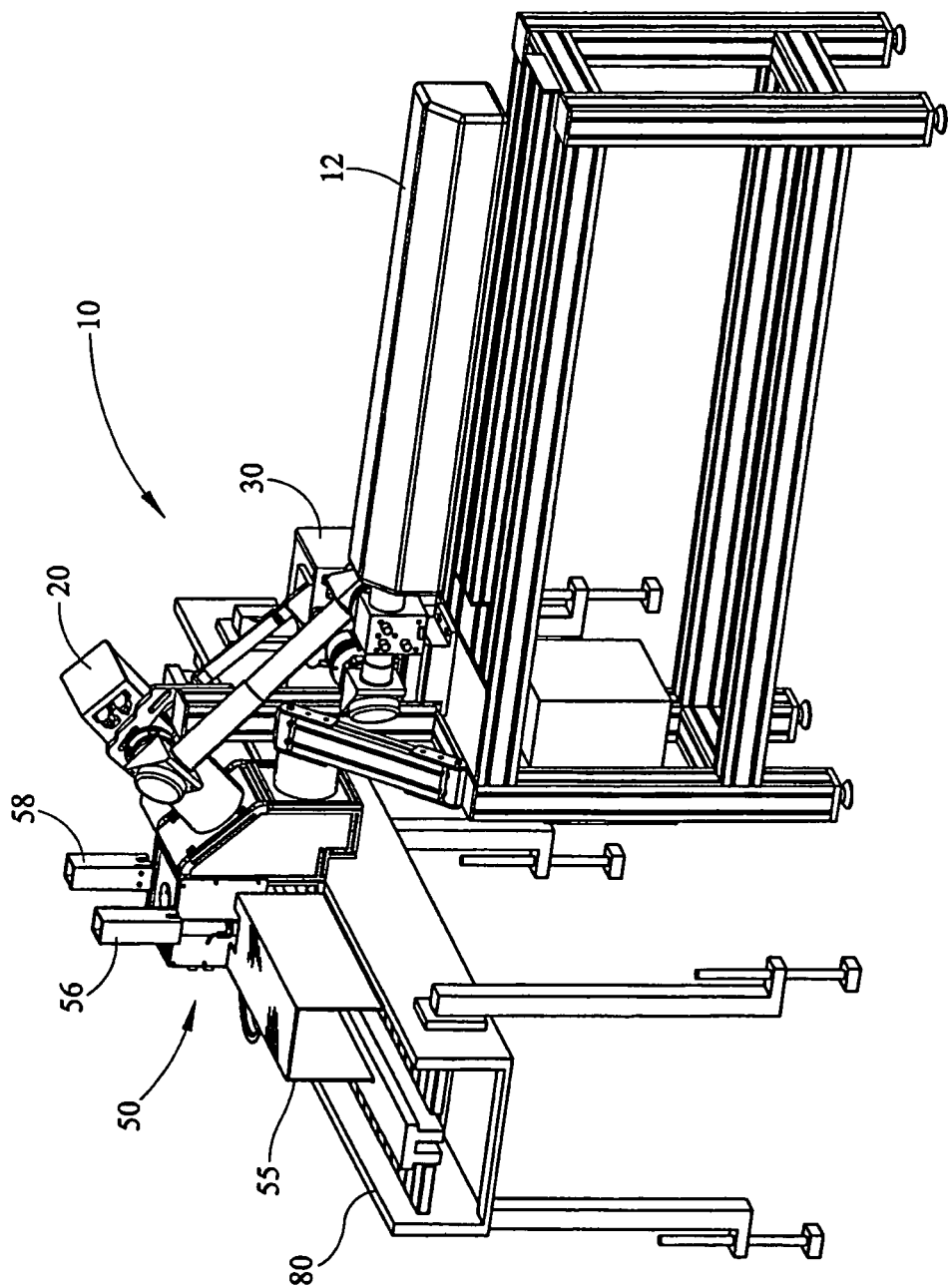
FIG. 2 is a rear perspective view of the laser marking apparatus of the present invention.

An exemplary embodiment of the laser marking apparatus of the present invention is depicted in FIG. 1. As is shown therein, the laser marking apparatus 10 of the present invention is comprised of a laser or laser emitting system 12 which is optically connected to a marking station 50. As shown in both FIG. 1 and FIG. 2, the laser marking apparatus 10 of the present invention is integrated into a material handling system or conveyor 80 which provides a conveyance path for reflectors 100 through the laser marking station 50 such that the reflectors 100 may be adequately positioned in optical alignment with a first scan head 20 or a second scan head 30. Such optical alignment of the reflector 100 within the laser marking station 50 allows the laser generating system 12 to ablate multiple surfaces on the luminaire reflector 100 automatically.

Preferentially, the laser marking apparatus 10 of the present invention is sufficient to etch or ablate a large number of parts in automated fashion. As is apparent, since the laser marking apparatus 10 of the present invention is integrated into an automated material handling apparatus, the speed of the laser marking apparatus is of relative importance and it is desirable for the laser marking apparatus of the present invention to laser mark a relatively high number of parts per minute, namely, in the order of ten parts per minute or more. Thus, the cycle time of the laser marking apparatus 10 of the present invention is preferably anywhere between one second and ten seconds per part. However, as is readily apparent, the throughput and efficiency of the laser marking apparatus of the present invention does not readily impact the novel features described herein.

Figure 3:
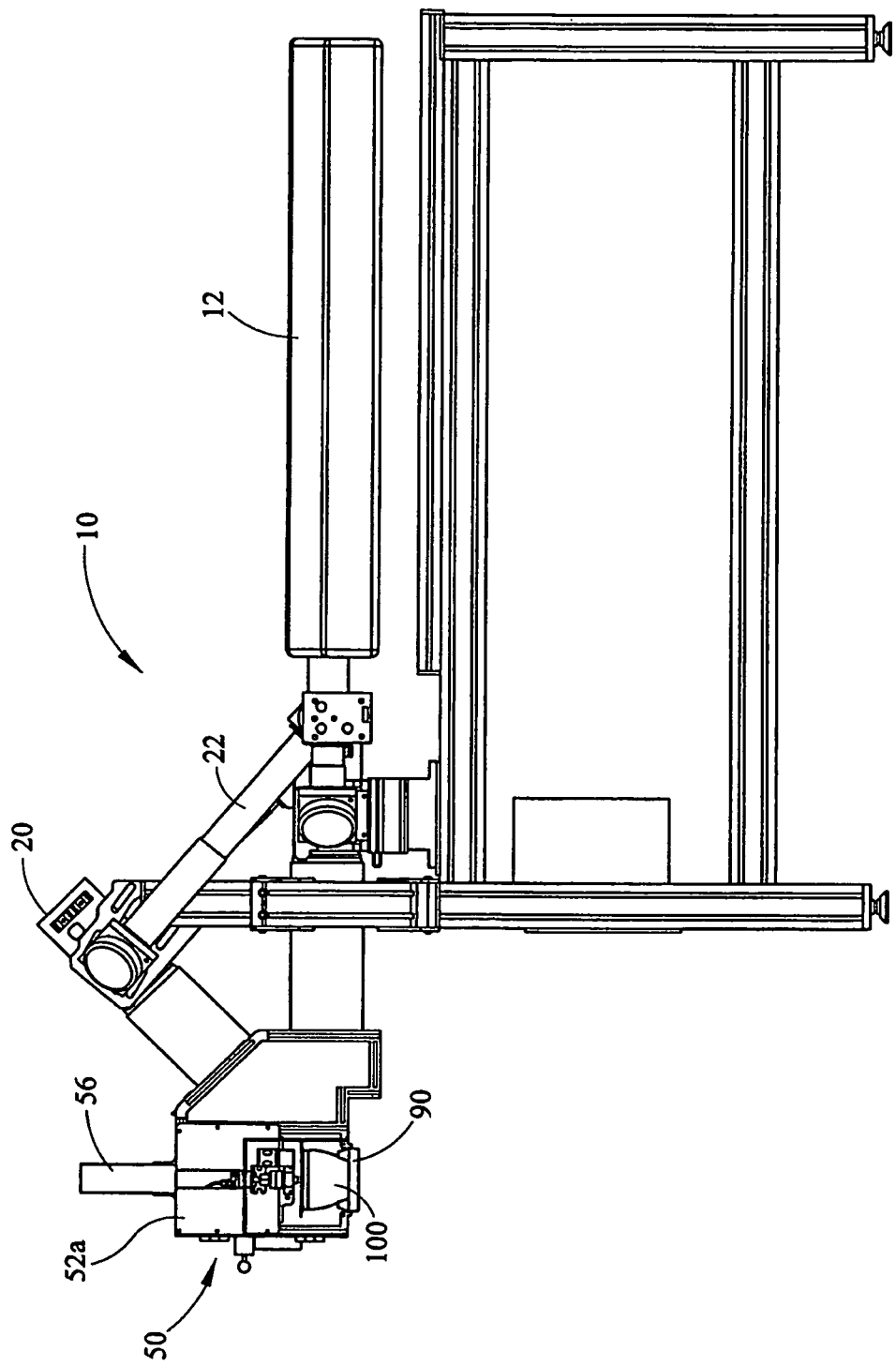
FIG. 3 is a side view of the laser marking apparatus of the present invention.
Figure 4:
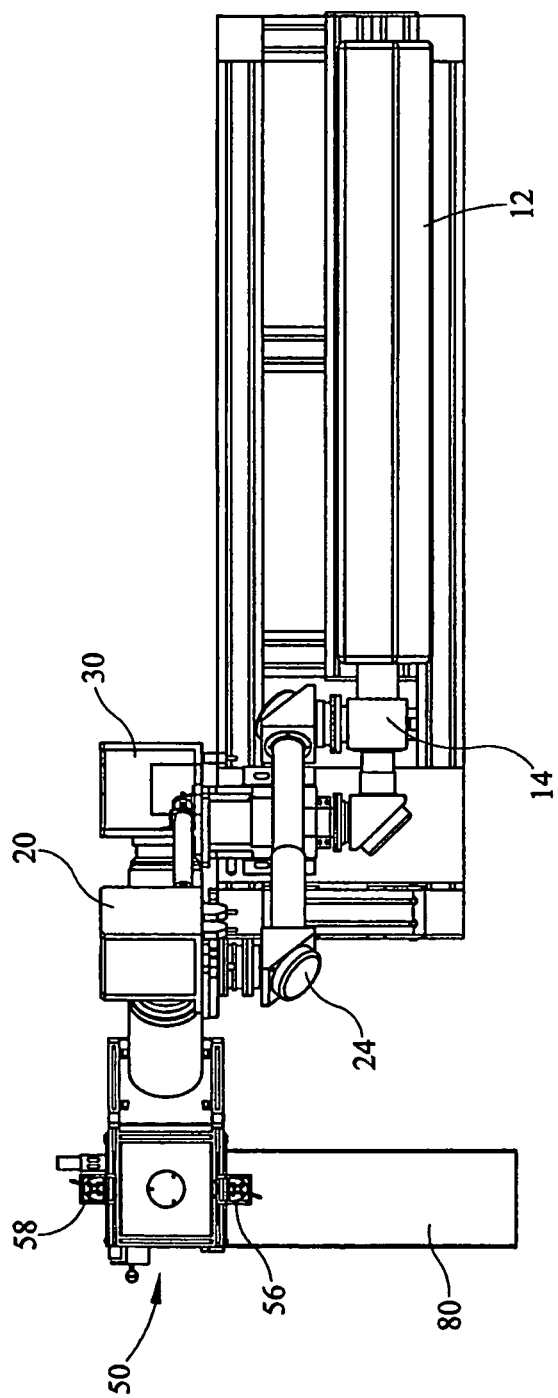
FIG. 4 is a top view of the laser marking apparatus of the present invention.

As is shown in the figures, the laser marking apparatus 10 of the present invention incorporates the utilization of a laser 12 into a laser marking station 50. The laser 12 may be a standard high powered laser, such as in Nd:YAG laser system which utilizes a FOBA laser. The laser 12 is optically connected to an upper scan head 20 and a lower scan head 30 for alternatively marking a surface of the reflector 100 as is shown by example in the drawings, particularly in FIGS. 3 and 4.

The laser 12 of the present invention is optically connected by a laser tube 22 to the upper scan head 20 which is positioned along an upper section or portion of the marking station 50 through which the reflector 100 passes. As is ascertainable from the figures, the laser tube 20 is optically aligned with a 90° mirror 24 in order to redirect the laser beam to the upper scan head 20. The upper scan head 20 directs the laser downward into the interior curved surface of the reflector 100. However, as is readily apparent, the configuration of the upper scan head is exemplary only as multiple configurations are known to one of ordinary skill in the art for integration into a laser marking station.

Alternatively, a beam switch 14 may be provided in order to integrate a second or lower scan head 30 in the laser marking apparatus 10 of the present invention. By utilizing a lower or second scan head 30 in the present invention, alternative markings may be placed on multiple surfaces of the reflector 100 within the laser marking station 50 of the present invention.

Figure 10:
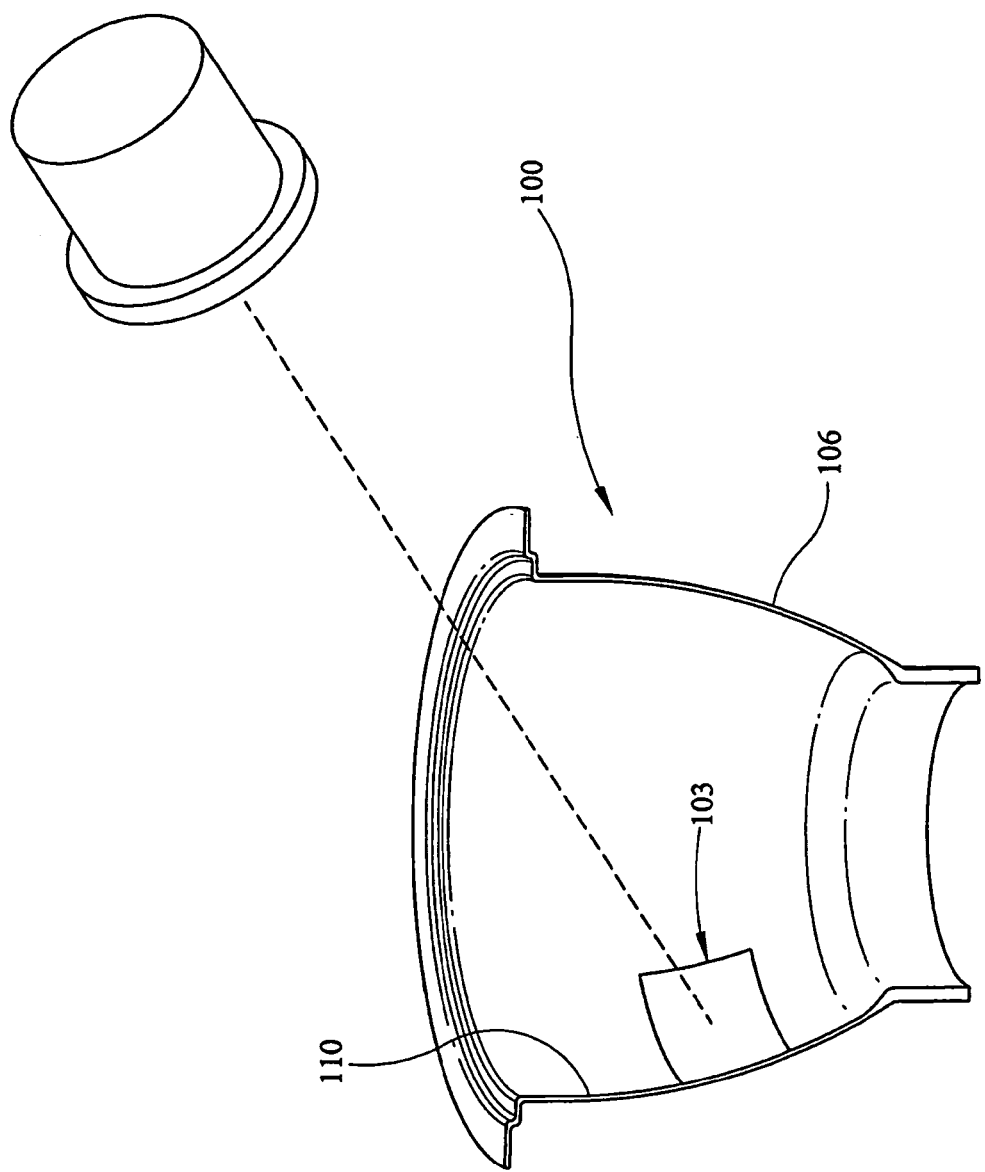
FIG. 10 is a side sectional view of an exemplary luminaire reflector marked using the laser marking apparatus of the present invention.

As is shown herein, a laser tube 22 optically connecting the laser 12 to the upper scan head 20 allows the upper scan head 20 to downwardly direct the laser beam onto an interior surface or writing area 103, shown in FIG. 10, of the interior wall 110 of the reflector 100. As is readily apparent, the writing area 103 on the interior wall of the reflector 100 is positioned deep enough into the reflector that the upper scan head 20 must be positioned angularly downwardly into the interior of the reflector interior wall 110.

As is also apparent in the exemplary embodiment shown herein, a laser beam switch 14 may be provided to alternatively direct the laser beam emitted from laser 12 to an alternative or second scan head 30 for the laser marking apparatus 10. The second scan head 30 redirects the laser through a side wall of the laser marking station 50 such that the second scan head 30 is in horizontal alignment with an exterior surface 106 of the reflector 100. Beam switch apparatus 14 may be automatically selected by a control subsystem, the laser control subsystem integrated with automated sensors for the conveyor 80, first and second door 52a and 52b and optical sensing mechanisms 45 internal to the marking station ensuring proper alignment of the reflector 100 in front of the upper scan head 20 and lower scan head 30.

The upper scan head 20 and lower scan head 30 may be high speed scan heads such as a Raylase superscan two axis deflection unit which has a larger aperture and longer focal length in order to accommodate the deep curve of the reflector interior surface 110. The high speed scan heads 20 and 30 provide a beam positioning architecture for proper focal length calculation and determination of the writing area 103 on the surface, and potentially curved surface of the reflector 100.

As has been mentioned, preferably the marking requirements for luminaire reflectors are met by placing indicia along a curved interior writing area 103 of the reflector 100, as is shown in FIG. 10. As is depicted, the marking area 103 may be on a curved interior surface and may extend in a writing area of approximately 3" by about 4" in height and width in order to adequately fit the necessary indicia on the interior surface 110 of the reflector 100. As is understood, when relamping the luminaire, the reflector writing area 103 is plainly visible after removal of the lamp. As the luminaire is relamped and the lamp is removed, the writing area 103 is typically in plain sight. Thus, it is preferable to etch or ablate indicia 105 on the curved surface as is shown in FIG. 10, such that it is plainly legible and visible upon relamping. Thus, the laser marking apparatus of the present invention must take into account the pronounced curve of the interior of the reflector. Thus, the scan heads must maintain a proper depth of focus for marking with sufficient quality such that the writing indicia 105 are plainly visible. Alternatively, while it is depicted that an exemplary writing are 103 is shown on an interior curved surface of the luminaire 100, alternative areas of the luminaire may be marked on either the interior surface 110 or the exterior surface 106. In either embodiment however, a proper focal length be maintained in order to legibly and clearly mark or ablate the surface of the reflector and an adequate depth of focus for the laser scan heads must be maintained.

Returning to the laser marking apparatus of the present invention, the apparatus integrates the laser 12 with a laser marking station 50. Automatic beam switching may be provided with the beam switch apparatus 14 allowing the laser to mark multiple surfaces of the reflector 100. High speed scan heads 20, 30 are provided with larger apertures for sufficient power density and longer focal lengths for greater depth of focus in order to accommodate the deep curve of the reflector 100 shown in FIG. 10. As has been referred to previously, a control subsystem or PLC interface with the conveyor may be used in order to synchronize the transport of the reflector 100 into the laser marking station 50 and in particular, position of the puck or pallet transport 90 on the conveyor 80 within the laser marking station 50. Thus, an optical sensing mechanism 65 positioned within the laser marking station 50 will determine the correct position both of the reflector 100 and conveyance puck or pallet 90 such that the reflector may be adequately marked by either the first or second scan heads 20, 30.

As is shown in the figures, the laser marking apparatus 10 of the present invention integrates a marking station or etching station 50 with a conveyor 80. The marking station 50 has a conveyor infeed 59 and a conveyor outfeed 55 for passing the luminaire 100 into and out of the marking station 50. The conveyor 80 may be a continuous conveyor that moves a pallet 90 or other device containing the reflector 100 as is necessary. Various actuators may be utilized in order to stop the pallet 90 in proper alignment and marking position within the marking station 50.

The marking station 50 further has a first door 52a and a second door 52b for opening and closing. A first door actuator 56 may operate to vertically position the first door 52a while a second door actuator 58 may be utilized to vertically actuate the second door 52b. These doors are actuated in order to allow the reflector 100 to enter into the conveyor marking station through the conveyor infeed 59 and exit the laser marking station through the conveyor outfeed 55. The first door 52a and second door 52b will fully enclose the laser marking station 50 such that the laser marking station 50 is optically enshrouded to prevent any of the laser light emitting from the laser scan heads 20 or 30 from exiting the laser marking station 50. As is therefore apparent, the laser marking station 50 of the present invention has a plurality of walls 51, each of the walls either filtered or opaque and further, the laser marking station 50 has a first and a second actuatable side wall 52a, 52b for entry and exit of the individual or multiple reflectors 100 into laser marking station 50.

In the configuration depicted, the laser marking station is therefore designed to actuate the door 52a and 52b in order to enclose the entire laser marking station 50 and allow etching of the reflector 100 by the laser 12 through either the first scanning head 20 or the second scanning head 30. Of course, a number of alternative constructions may be utilized for a laser marking station which incorporates the novel feature of the laser marking apparatus of the present invention. The exemplary embodiment depicted herein is not intended to be limited by the particular structure utilized as many variant configurations may incorporate the spirit and scope of the teachings herein.

Turning now to the alternative figures, the laser marking station 50 of the present invention utilizes the first door actuator 56 and second door actuator 58 in order to raise and lower first side wall or door 52a and second side wall or door 52b. Additionally, an upper marking aperture 53 is positioned adjacent to the first scan head or upper scan head 20 in order to allow for optical alignment of the scan head 20 and the writing area 103 of the luminaire reflector 100. In the present embodiment, the upper marking aperture 53 is positioned so as to allow the first or upper scan head 20 to be in optical alignment with a preferred interior writing area, as is depicted in FIG. 10, in order to allow a wide or large writing window 103. Other marking station walls 51 may be provided and, as indicated herein, may be opaque or filtered.

A lower marking aperture 54 may also be provided which is optically aligned with the lower or second scan head 30 in order to provide an alternative marking area or surface of the reflector 100 along an exterior wall 106. The lower marking aperture 54 allows for the laser marking apparatus 10 of the present invention to alternatively mark, utilizing the beam switch 14, a plurality of surfaces or positions of the reflector 100. The lower marking aperture 54, as is depicted, may be in horizontal alignment with an exterior side wall of 106 of the reflector 100 while the upper marking aperture 53 may be in optical alignment with an interior side wall 110 of the reflector 100.

Figure 6:
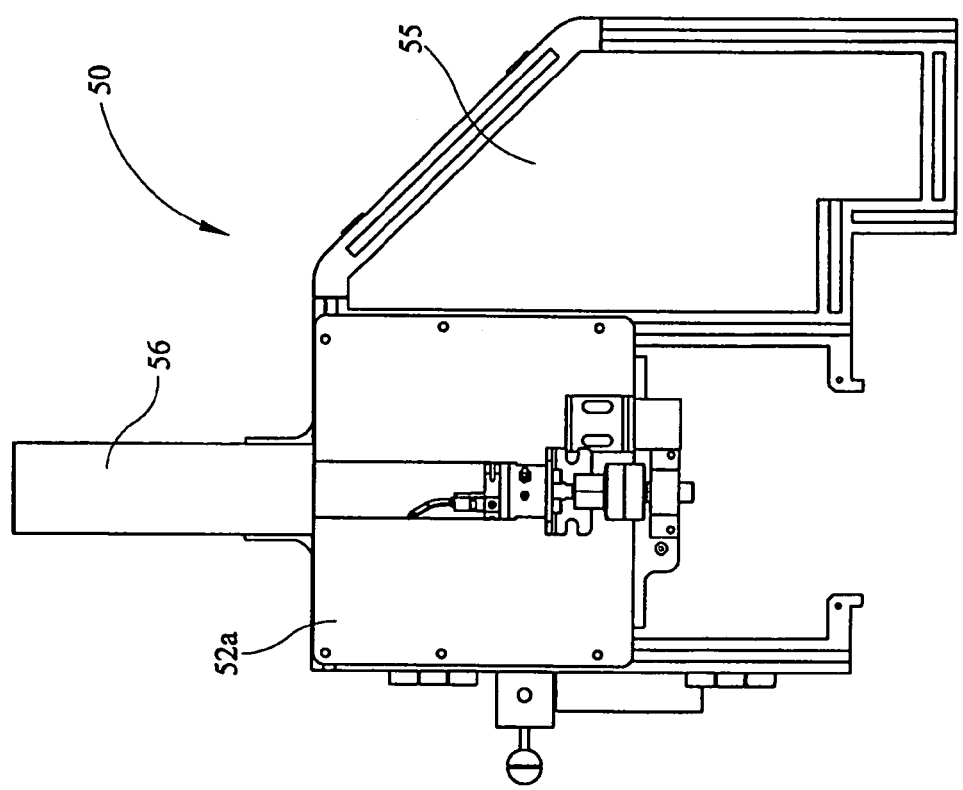
FIG. 6 is a side view of the laser marking station utilizing the system of the present invention.
Figure 7:
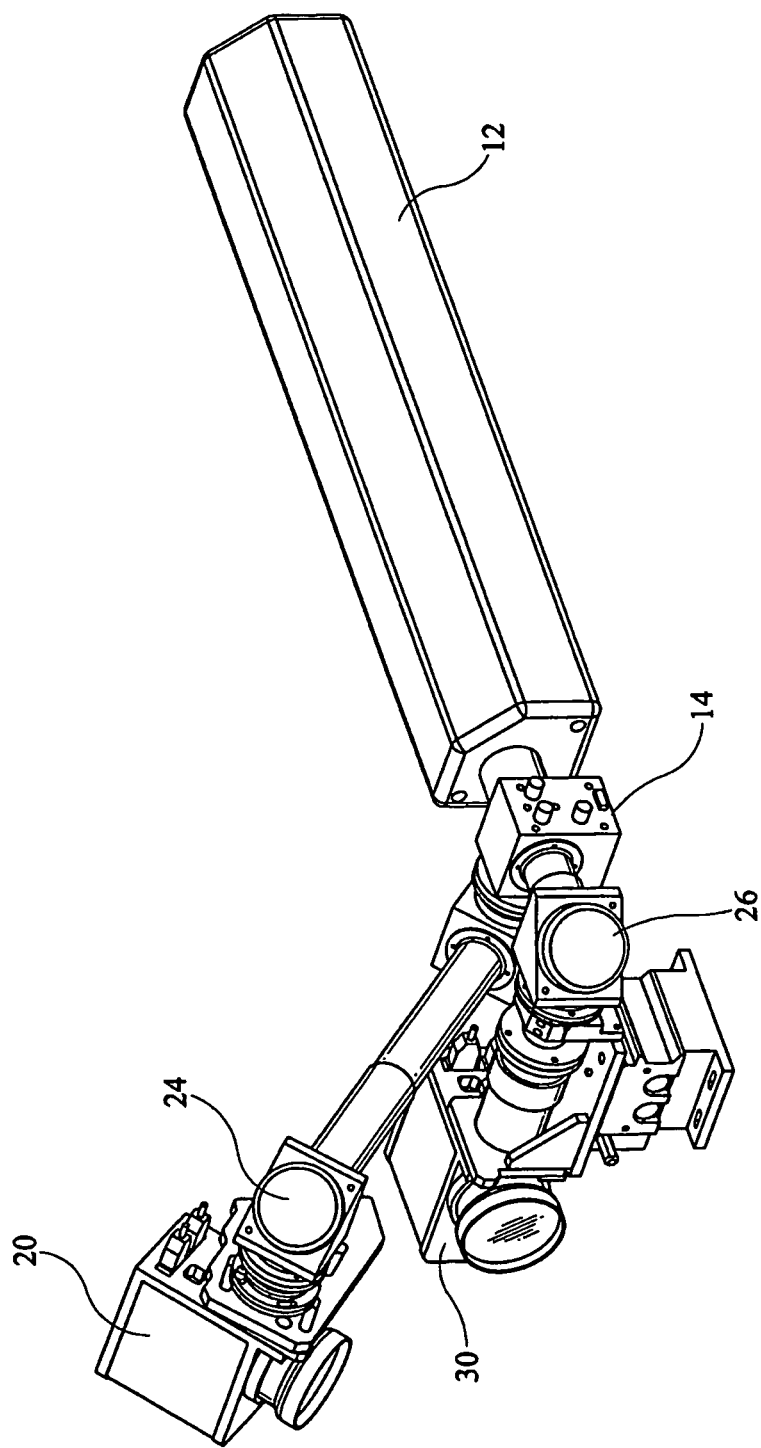
FIG. 7 is an upper perspective view of the laser system incorporated into the system of the present invention.

As is shown in FIG. 6 in conjunction with the remaining figures, the laser marking station or etching station 50 utilizes actuators to raise and lower the first door 52a and second door 52b. As may be provided, the reflector 100 may be positioned on the pallet 90 which is moveable by the conveyor 80. The continuous conveyor 80 extends through the laser marking station 50 via the conveyor infeed 59. Upon entry into the conveyor infeed area 59 of the marking station 50, the control subsystem ensures that the first door 52a is raised utilizing first door actuator 56 such that the puck or pallet 90 contained in the reflector 100 is allowed entry into laser marking station. An optical sensor 65 or a number of sensors may be positioned within the interior of the laser marking station 50 in order to ensure both the proper position of the pallet 90 and the reflector 100. Once such position is confirmed, the side wall or first door 52a may be lowered utilizing first door actuator 56 and laser etching of the surface of the reflector 100 may begin. Upon completion of the etching cycle of the laser 12 through scan heads 20 or 30, the second door or side wall 52b may be raised by second door actuator 58 so that the pallet 90 is allowed to be released from inside the laser marking station 50 and move along the conveyance path or conveyor outfeed 55 to an alternative material handling apparatus not shown. The entire etching or laser marking cycle may then be repeated.

Figure 5:
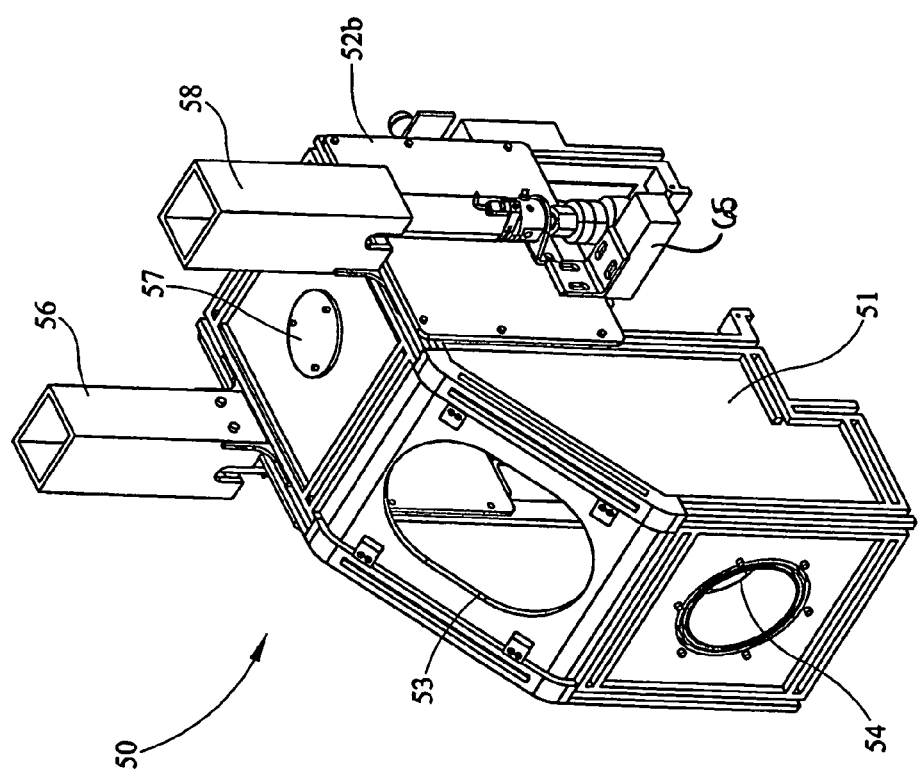
FIG. 5 is a upper perspective view of the laser marking station utilized in the system of the present invention.

Also, as is shown in FIG. 5, since the laser is ablating a surface of the powder coated reflector, material may emanate during the ablating process. Such material resulting from the vaporization of the coating on the reflector may be removed through a vacuum source or system which is connected to the laser marking station 50 through vacuum hole aperture 57.

As apparent from the design of the laser marking station 50, both an upper aperture 53 and a lower aperture 54 are provided for multiple scan heads 20 and 30. Upper scan head as described is optically connected a laser 12 through beam switch 14 and 90° mirror 24. Lower scan head 30 is optically connected to a laser 12 through beam switch 14 and 90° mirror 26. Each of the scan heads may be actuated through the control subsystem of the laser system of the present invention depending on which surface of the reflector is desired to be etched. Ideally, as the interior upper surface, upper when installed in the luminaire, is directly visible when relamping of the luminaire, the curved surface and writing area 103 shown in FIG. 10 is preferable when etching a surface of the reflector 100. However, the lower marking aperture 54 is provided such that multiple surfaces of the luminaire reflector 100 may be etched with any requisite material and indicia.

Figure 8:
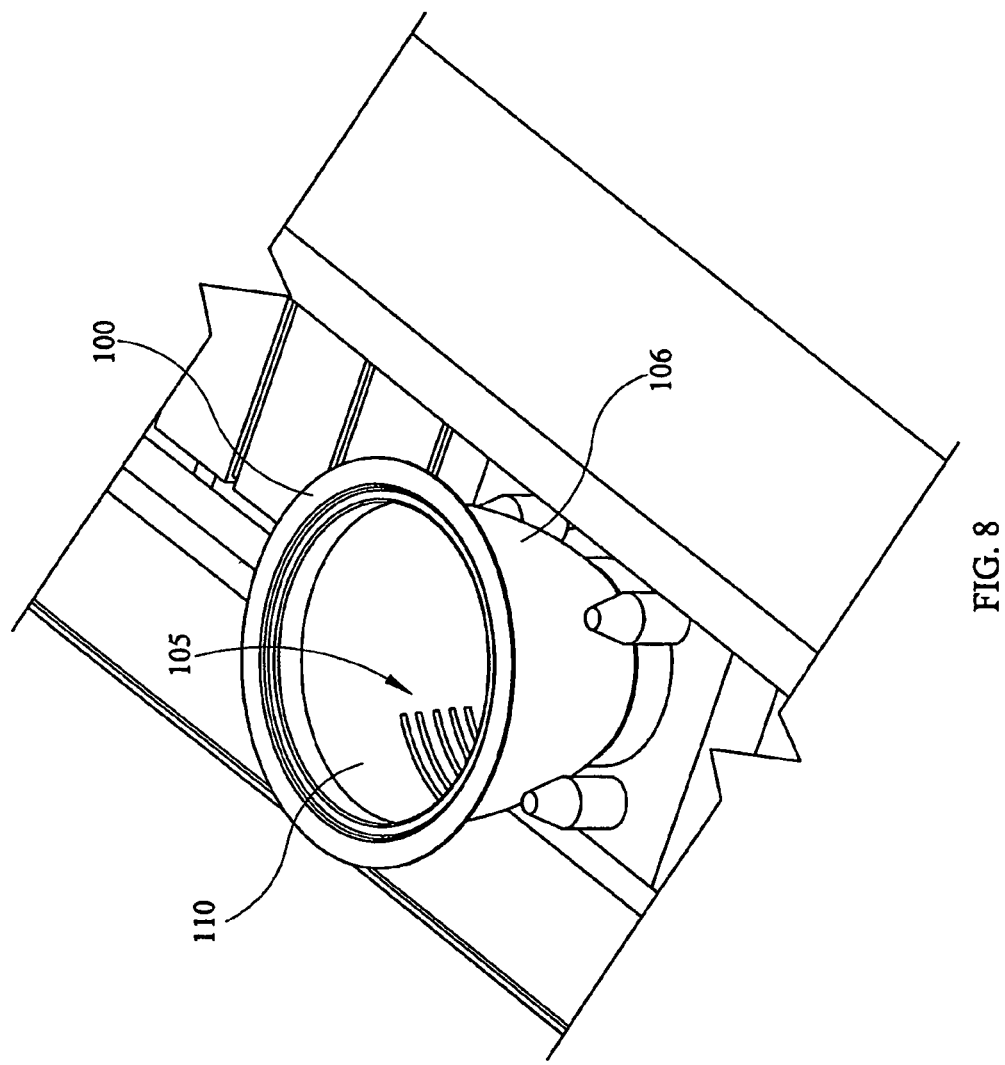
FIG. 8 is an upper perspective view of the luminaire reflector etched with the laser marking apparatus of the present invention.
Figure 9:
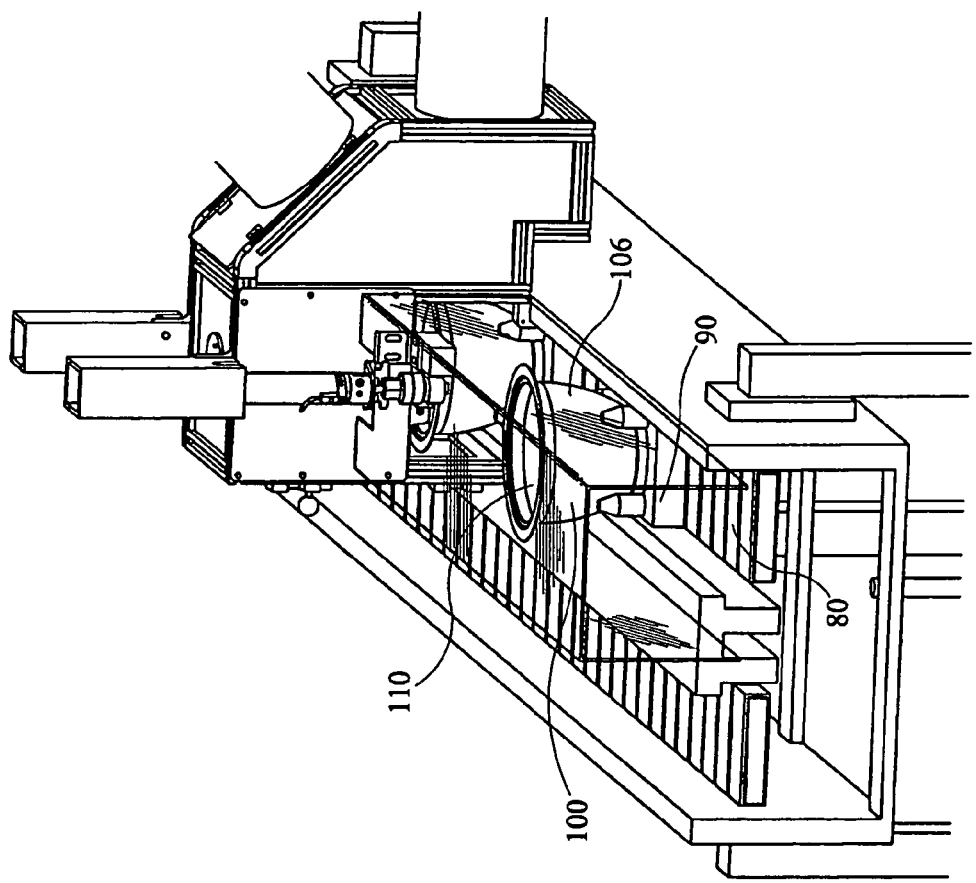
FIG. 9 is a perspective view of the reflector exiting the laser marking apparatus on the conveyor system, all of which are incorporated in the present invention.

As shown in FIG. 8, the reflector 100 has writing indicia 105 positioned along an interior wall 110 of the reflector 100 with a writing area 103 preferably being approximately 3" by 4". However, any writing area may be desirable such that the indicia 105 is plainly visible upon relamping of the luminaire with clear and legible markings. The reflector 100 is any type of reflector utilized within a luminaire, and preferably a recessed luminaire, and more preferably a hydroformed aluminum or steel reflector which is powder coated or coated with any type of reflective surface and which has a multitude of curvatures and designs. In the present embodiment, a nominal 6" cone and nominal 5" cone reflector are marked with the laser scanning heads 20 and 30 optimized to the curvature of the two cones particularly utilized. The exemplary cones utilized are Lytecaster recessed down lighting 6¾" aperture basic baffle reflector trim, part no. 1176 or a Lytecaster recessed down lighting 5" aperture basic baffle reflector trim, part no. 1076. However, a large number of curved or planer reflectors may be utilized but, utilizing the curved reflectors as depicted requires that the scan heads 20 and 30 take into account the deep curvature and large writing areas necessary in order to preserve the proper focal length across the entire writing area 103. The writing indicia 105 etched or ablated onto the surface of the reflector may include relamping specifics, ballast information, power rating, and other necessary indicia which is typically placed upon luminaires to meet UL requirements. Etching on the powder coated aluminum substrate of the luminaire reflector causes vaporization of the powder coated surface such that the markings or written material are permanently visible on the surface of the reflector 100 and non-removeable.

The laser marking apparatus 10 of the present invention may be implemented in many different configurations. The integration of the laser 12 with the laser marking station 50 as depicted herein, is provided as exemplary only and no unnecessary limitations are to be interpreted from the particular implementation and structure disclosed. Many alternative structures may be utilized in order to implement the spirit and scope of the teachings herein and no unnecessary limitations of the laser marking station 50, scan heads 20 and 30 or conveyance system 80 and 90 are to be interpreted as the scope of the teachings hereof are intended to cover broadly various laser etching and ablation techniques and apparatus for utilization with the powder coated luminaire as well as other luminaire reflectors and surfaces.

The invention claimed is:

1. A luminaire reflector marking station, comprising:
   a laser marking station having a conveyor infeed area and a conveyor outfeed area and a conveyor extending between said infeed and said outfeed;
   a first laser scan head optically connected to a laser, said first laser scan head directing a laser beam into said laser marking station;
   a bell shaped luminaire reflector passing through said laser marking station on said conveyor, said reflector held in an alignment position with said scan head by a pallet transport movable between said infeed and said outfeed;
   wherein said laser etches indicia on either an interior curved side of said luminaire or an exterior curved side of said luminaire;
   wherein said laser marking station has a second scan head, said laser optionally optically coupled to both said first scan head and said second scan head by a laser beam switch.

2. The luminaire reflector marking station of claim 1 wherein said laser is in optical alignment with a curved exterior side of said luminaire.

3. The luminaire reflector marking station of claim 1 wherein said laser is in optical alignment with a curved interior side of said luminaire.

4. The luminaire reflector marking station of claim 1 wherein said laser is an Nd:Yag laser.

5. The luminaire reflector marking station of claim 1 wherein said laser is in optical alignment with area on said side of said luminaire of about 4 inches by 3 inches in dimension.

6. The luminaire reflector marking station of claim 1 wherein said laser marking station has a first door actuatable over said conveyor infeed and a second door actuatable over said conveyor outfeed.

7. The luminaire reflector marking station of claim 1 wherein said laser marking station is an opaque enclosure.

8. The luminaire reflector marking station of claim 1 wherein said first laser scan head is mounted on a top portion of said laser marking station.

9. The luminaire reflector marking station of claim 1 wherein said reflector is a hydroformed powder coated reflector.

10. A laser etching station for marking a curved surface of a powder coated luminaire reflector, comprising:
    a conveyor extending through a laser etching station;
    a laser optically connected to a first scan head, said first scan head positioned adjacent an aperture in said laser etching station, said scan head directing a laser beam into said laser etching station;
    a first side door and a second side door actuatable to open and close on said laser etching station;
    a powder coated luminaire reflector positioned in an optical path of said laser within said laser etching station;
    wherein the focal point of said laser beam emitted by said first scan head is optimized along a curved plane of an interior surface of said reflector.

11. The laser etching station of claim 10 wherein said laser has a second scan head optically connected to said laser for marking on an exterior surface of said reflector.

12. The laser etching station of claim 11 further comprising a beam switch device interposed between said first scan head, said second scan head and said laser.

13. A laser ablating station for ablating the surface of a luminaire reflector, comprising:
- a conveyor passing a powder coated reflector through a laser ablating station;
- a filtered or opaque enclosure forming said laser ablating station, said station having a conveyor infeed and conveyor outfeed;
- an upper scanning head and a lower scanning head both in optical connectivity to a laser and focusing said laser onto a curved surface of said luminaire reflector;
- a laser beam switch allowing said laser be switched to either said upper scanning head or said lower scanning head.

14. The laser ablating station of claim 13 wherein said ablating laser of said upper scanning head is focused on an interior curved surface of said luminaire reflector and wherein said oblating laser of said lower scanning head is focused on an exterior curved surface of said luminaire reflector.

15. The laser ablating station of claim 14 wherein said laser is a Nd:Yag laser.

16. The laser ablating station of claim 14 wherein said station further has a vertically actuable conveyor infeed door and a vertically actuable conveyor outfeed door.

17. The laser ablating station of claim 15 wherein said laser is a 100 watt laser.

18. A system for laser ablating an interior surface of a powder coated luminaire reflector, comprising:
- a conveyor having a path through a laser ablation station;
- a plurality of walls surrounding said laser ablation station;
- a first laser lens system for directing a laser to said reflector;
- an optical sensing mechanism electronically connected to a control subsystem to determine when a reflector is positioned in optical alignment with said first laser lens system;
- said system further comprising a second laser lens system for directing said laser to a second position on said reflector;
- wherein said first lens system is optically aligned to an interior curved surface of said reflector;
- where said second lens system is optically aligned to an exterior surface of said reflector.

* * * * *